3,326,874
ADDITION POLYMERIZATION OF POLYMERIZABLE UNSATURATED COMPOUNDS WITH XENON FLUORIDES AS INITIATORS

Vaughn Arthur Engelhardt, Windsor Hills, Wilmington, Del., assignor to E. I. du Pont de Nemours and Company, Wilmington, Del., a corporation of Delaware
No Drawing. Filed Mar. 6, 1964, Ser. No. 350,120
5 Claims. (Cl. 260—92.1)

This invention relates to the polymerization of organic compounds, and more particularly to a new process employing catalysts capable of initiating addition polymerization.

Addition polymers, because of their versatile properties and relatively low cost, have penetrated many large volume industrial outlets and in many instances have essentially displaced the naturally occurring resins and other polymeric materials. In spite of the great progress which has been made in the understanding of polymerization initiators and of polymer structure, new initiators are continuously being sought which are either more active and hence permit the use of milder polymerization conditions, or which give radically new polymer structures, or which provide a broader spectrum of use than presently known initiators, or which combine two or all of these desired goals.

This invention has as an object the provision of new polymerization initiators for monomers capable of addition polymerization. A particular object is the provision of solid polymerization initiators capable of activity at room temperature for the polymerization of fluorinated olefins such as tetrafluoroethylene.

These and other objects are accomplished in accordance with this invention wherein unsaturated monomers capable of addition polymerization are polymerized at temperatures from —80° C. to 300° C. in the presence of at least 0.001% by weight, based on said unsaturated monomers, of xenon fluorides.

In one method for operating in accord with this invention, a pressure reactor is charged with the unsaturated monomer and reaction medium, if any. The reactor is connected to an evacuation system, cooled to a temperature of about —80° C., and evacuated to remove oxygen. Measured amounts of monomer and xenon fluorides are added and the system maintained at the temperature selected for polymerization. The desired polymer is recovered from the reaction mixture by conventional methods.

The xenon fluorides used as initiators in the process of this invention are prepared by several known methods (J. Am. Chem. Soc., 84, 3593 (1962), and J. Am. Chem. Soc., 85, 110 (1963)).

The specific xenon fluorides operative in the process of the present invention are xenon di-, tetra-, or hexafluoride or any mixture thereof. These compounds are solids at the preferred polymerization temperatures and are particularly novel due to their containing fluorine and no hydrogen and their high degree of reactivity as polymerization initiators at low temperatures.

The polymerization process of this invention is carried out at temperatures as low as —80° C. or as high as 300° C. Preferred temperatures of from 0° C. to 30° C. are employed to obtain good conversion to polymer with good reaction rates.

The polymerization process of the present invention can be carried out under a wide range of pressures, i.e., from subatmospheric to superatmospheric pressures. Pressures as high as 3000 atmospheres may be used with a range of about one to 300 atmospheres being preferred.

The time of reaction at the temperatures employed may be as short as five minutes or as long as 24 hours. A preferred time of reaction is in the range of 0.2 to 8 hours, depending upon other reaction conditions and upon the monomers employed.

The amount of xenon fluorides employed as initiator in the process of the present invention can vary from 0.001% by weight to as high as 10% by weight based on the monomer. Preferred amounts employed are in a range of from 0.001 to 2% by weight based on the monomer.

The new xenon fluoride initiators of this invention are effective for the polymerization of any of the monomers known to be capable of addition polymerization. Examples of such polymerizable monomers are ethylene, propylene, butadiene, styrene, 2,3-dimethylbutadiene-1,3, vinyl acetate, vinyl chloride, vinyl fluoride, chlorotrifluoroethylene, tetrafluoroethylene, perfluoropropylene, methyl vinyl ether, and acrylic and methacrylic acids and their esters and amides. These monomers can be polymerized alone or in admixture with each other in accord with the process of this invention to produce homopolymers and copolymers.

In some cases, a neutral reaction medium, i.e., a medium unreactive toward the xenon fluorides under the conditions of the reaction, may be employed with advantage during the polymerization. For example, in the polymerization of fluorinated olefins, the saturated perhalogenated hydrocarbons are a preferred reaction medium.

The following examples illustrate the new process but are not to be construed as limiting the scope of the invention.

EXAMPLE I

One hundred ml. of gaseous xenon was mixed with 300 ml. of gaseous nitrogen difluoride, $N_2F_2$, in a 300 ml. Monel (nickel, copper, iron alloy) cylinder, and the mixture heated for 24 hours at 90° C. to 100° C. on a steam bath. Initially, the internal pressure was 5 lb./sq.in. at 25° C. and at the end of the 24 hour reaction period it was 14 lb./sq. in. at 25° C. The reactor was cooled to —196° C. and the part of the contents which was volatile at this temperature was removed by exhaustion. Thereafter, the reactor was allowed to warm to 25° C., then cooled to —78° C., and the part of the contents which was volatile at this temperature was removed by exhaustion. The white mass which remained in the reactor was collected in a glass trap and identified as a mixture of xenon di-, tetra-, and hexafluoride by mass spectroscopy. The xenon hexafluoride, which constituted only a minor portion of the mixture was found to react vigorously with glass leaving a mass of substantially xenon tetrafluoride. The xenon tetrafluoride was sublimed and stable at room temperature.

Three hundred ml. of gaseous tetrafluoroethylene, at standard temperature and pressure, 1 ml. of liquid perfluorodimethylcyclobutane, and about 2 mg. of xenon fluorides as produced above, were placed in a platinum tube which was thereafter sealed. The contents were then held at 0° C. and 1000 lbs./sq. in. for five hours. Upon opening the reactor there was recovered 0.355 g. of polytetrafluoroethylene, which corresponds to a 26.5% conversion.

EXAMPLE II

A catalytic amount of solid xenon tetrafluoride was added to an evacuated glass vessel tubular reactor. The reactor was then filled to about 1.0 atmosphere with gaseous tetrafluoroethylene and allowed to stand at 25° C. After standing between 15 and 30 minutes, a white film of solid polytetrafluoroethylene was observed on the walls of the reactor.

The particular value of the xenon fluorides lies in their ability to function as active polymerization initiators at room temperature and lower; moreover, due to their composition, i.e., of fluorine and no hydrogen, they are particularly useful as initiators in the preparation of polymers and copolymers of lower fluoroolefins such as tetrafluoroethylene and hexafluoropropylene having improved thermal stability by virtue of their having terminal fluorine.

It can be seen that a novel improved polymerization process has been provided. Various modifications within the spirit of this invention will occur to those skilled in the art, and it is intended that all such are to be included within the scope of the following claims.

I claim:

1. A process for the polymerization of unsaturated compounds that undergo addition polymerization which comprises polymerizing said unsaturated compounds at a temperature from −80° C. to 300° C. in the presence of at least 0.001% by weight of xenon fluorides as initiator.

2. A process for the polymerization of fluorinated olefins which comprises polymerizing said fluorinated olefin at 0° C. to 30° C. in the presence of at least 0.001% by weight of xenon fluorides as initiator.

3. The process of claim 2 wherein the said fluorinated olefin is tetrafluoroethylene.

4. A process for the polymerization of fluorinated olefins which comprises polymerizing said fluorinated olefin at 0° C. to 30° C. in the presence of at least 0.001% by weight of xenon tetrafluoride as initiator.

5. The process of claim 4 wherein the said fluorinated olefin is tetrafluoroethylene.

No references cited.

JOSEPH L. SCHOFER, *Primary Examiner.*

J. A. DONAHUE, *Assistant Examiner.*